United States Patent
Büttiker

(10) Patent No.: US 9,351,601 B2
(45) Date of Patent: May 31, 2016

(54) METHOD FOR PRODUCING A COFFEE BEVERAGE AND COFFEE MACHINE FOR PERFORMING THE METHOD

(75) Inventor: Philipp Büttiker, Oberbuchsiten (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 126 days.

(21) Appl. No.: 14/343,238

(22) PCT Filed: Sep. 10, 2012

(86) PCT No.: PCT/CH2012/000214
§ 371 (c)(1),
(2), (4) Date: Apr. 15, 2014

(87) PCT Pub. No.: WO2013/037076
PCT Pub. Date: Mar. 21, 2013

(65) Prior Publication Data
US 2014/0242226 A1 Aug. 28, 2014

(30) Foreign Application Priority Data
Sep. 13, 2011 (EP) .................................... 11405320

(51) Int. Cl.
*A47J 31/40* (2006.01)
*A23F 5/26* (2006.01)
(Continued)

(52) U.S. Cl.
CPC ................ *A47J 31/402* (2013.01); *A23F 5/26* (2013.01); *A23F 5/262* (2013.01); *A47J 31/002* (2013.01);
(Continued)

(58) Field of Classification Search
CPC .......... A47J 31/40; A47J 31/46; A47J 31/402; A47J 31/467; A47J 31/002; A47J 31/52; A47J 31/4496; A23F 5/26; A23F 5/262
See application file for complete search history.

(56) References Cited

U.S. PATENT DOCUMENTS

| | | | | |
|---|---|---|---|---|
| 5,063,837 A | * | 11/1991 | Precht | .................. A47J 31/061 99/295 |
| 5,259,296 A | | 11/1993 | Mikael et al. | |

(Continued)

FOREIGN PATENT DOCUMENTS

| | | |
|---|---|---|
| CA | 2 683 665 A1 | 6/2010 |
| CN | 101103879 A | 1/2008 |

(Continued)

OTHER PUBLICATIONS

International Search Report for Application No. PCT/CH2012/000214 dated Nov. 26, 2012.

(Continued)

*Primary Examiner* — Anthony Weier
(74) *Attorney, Agent, or Firm* — Alston & Bird LLP

(57) ABSTRACT

The invention relates to a method for producing a coffee beverage in a brewing chamber (36) of a coffee machine (10) and to a coffee machine (10) for performing a method for producing a coffee beverage. The aim of the invention is to improve the dispensing of coffee, especially in its first phase, in order to avoid undesired splashing due to increased pressure of the coffee beverage at the coffee beverage outlet (47), According to the method of the invention, the brewing water is supplied to the brewing water inlet (35-1) of the brewing chamber (36) at a first volume flow rate during a first period of time (T1) of a first brewing phase (a), and during a second period of time (T2) of the first brewing phase (a), the brewing water is supplied to the brewing water inlet (35-1) of the brewing chamber (36) at a second volume flow rate, wherein the first volume flow rate and the second volume flow rate are both different from zero and wherein the second volume flow rate is lower than the first volume flow rate.

17 Claims, 3 Drawing Sheets

(51) Int. Cl.
*A47J 31/46* (2006.01)
*A47J 31/44* (2006.01)
*A47J 31/52* (2006.01)
*A47J 31/00* (2006.01)

(52) U.S. Cl.
CPC .............. *A47J 31/40* (2013.01); *A47J 31/4496* (2013.01); *A47J 31/46* (2013.01); *A47J 31/467* (2013.01); *A47J 31/52* (2013.01)

(56) References Cited

U.S. PATENT DOCUMENTS

| | | | | |
|---|---|---|---|---|
| 5,669,287 | A | * | 9/1997 | Jefferson, Jr. ............. A23F 5/26 99/295 |
| 5,901,635 | A | | 5/1999 | Lucas et al. |
| 6,148,717 | A | * | 11/2000 | Lassota ................. A47J 31/002 222/1 |
| 6,405,637 | B1 | * | 6/2002 | Cai ....................... A47J 31/002 99/293 |
| 6,571,685 | B1 | * | 6/2003 | Lassota ................. A47J 31/002 99/283 |
| 7,225,728 | B2 | | 6/2007 | Lyall, III |
| 7,717,026 | B1 | * | 5/2010 | Lassota .................. A47J 31/36 99/283 |
| 8,063,837 | B1 | * | 11/2011 | Jennings ............... H01Q 1/1214 343/705 |
| 8,663,724 | B1 | * | 3/2014 | Banasik .............. A47J 31/0631 426/431 |
| 2007/0261564 | A1 | | 11/2007 | Suggi Liverani et al. |
| 2010/0031826 | A1 | | 2/2010 | Doglioni Majer |
| 2010/0209577 | A1 | * | 8/2010 | Doglioni Majer .. A47J 31/3614 426/433 |

FOREIGN PATENT DOCUMENTS

| | | |
|---|---|---|
| CN | 201164370 Y | 12/2008 |
| CN | 101437431 A | 5/2009 |
| DE | 20 2006 014 317 U1 | 2/2008 |
| EP | 0 559 620 A1 | 9/1993 |
| EP | 1 902 653 A2 | 3/2008 |
| EP | 2 196 116 A1 | 6/2010 |
| GB | 2448891 A | 11/2008 |
| JP | 2001275839 * | 10/2001 |

OTHER PUBLICATIONS

International Preliminary Report on Patentability for Application No. PCT/CH2012/000214 dated Aug. 5, 2013.
Search Report from corresponding Chinese Patent Application No. 2012800440265 dated Aug. 27, 2015.

* cited by examiner

METHOD FOR PRODUCING A COFFEE BEVERAGE AND COFFEE MACHINE FOR PERFORMING THE METHOD

The present invention relates to a method for producing a coffee beverage in a brewing chamber of a coffee machine and a coffee machine for performing a method for producing a coffee beverage in a brewing chamber.

In particular, the invention relates to a method in which the volume flow rate at which brewing water is supplied to the brewing water inlet of the brewing chamber is varied during the preparation of the coffee beverage.

In this case, preferably at least a part of the brewing water supply is used for the initial build-up of pressure in the brewing chamber.

Methods for producing coffee beverages in which the brewing water is supplied to the brewing chamber in a clocked or pulsed matter are known in the art. Thus, for example, the U.S. Pat. No. 7,225,728 B2 describes a coffee machine in which a control device performs pulsed activation of the brewing water pump. The purpose of such methods known from the prior art is always to ensure as complete as possible wetting of the hydrophobic coffee ground particles inside the brewing chamber during the brewing process. Thus, it was already identified in the methods known from the prior art that in the interior of the quantity of coffee grounds penetrated by the brewing water in the brewing chamber, regular preferential paths are formed during passage of the brewing water so that the wetting of the total quantity of coffee grounds inside the brewing chamber is not sufficiently homogenous for an optimal formation of flavour. Such methods known, for example, from U.S. Pat. No. 7,225,728 B2 now provide an intermittent operation of the brewing water pump where the brewing water pump is switched on over a period of time of several seconds, for example, ten seconds during the brewing process and is then switched off again for a period of time of several seconds, for example, five seconds. Depending on the specific configuration of the known method, such a pulse sequence can be repeated more or less frequently during a brewing process depending on the desired flavour profile of the coffee beverage to be prepared. In each case in such methods known from the prior art, the resulting volume flow rate through the brewing chamber is reduced to zero due to the multi-second interruption.

It is further known to provide a so-called cream valve at the chamber outlet of the brewing chamber. Such a valve is usually provided with an independent mechanical restoring device such as, for example, a spiral spring which is pre-tensioned in the direction of closure of the cream valve. In its closed position, such a known cream valve closes the chamber outlet, for example with a rubber plug. If the water pressure inside the brewing chamber increases due to the supplied brewing water during a brewing process, such a known cream valve is pressed through the increasing pressure against the restoring force of the spiral spring into its open position so that a more or less narrow passage gap is formed at the chamber outlet through which the brewed coffee beverage is then supplied to a dispensing device, for example, a coffee outlet. The purpose of this passage gap is to create a particularly fine-pored flavour-binding froth, the so-called cream, due to turbulence of the escaping coffee beverage.

The German Utility Model Specification DE 20 2006 014 317 U1 discloses a coffee machine having a brewing unit connected to a hot water supply, where a spring-loaded cream valve which opens automatically under the action of pressure is incorporated in the coffee outlet line. In addition, a controllably configured actuator is provided as an actuator for specific opening of the cream valve. The solution known previously from DE 20 2006 014 317 U1 provides to divide a brewing cycle during preparation of a coffee beverage into two phases, wherein during a first phase a pump which supplies the brewing water into the brewing unit or brewing chamber is operated at a nominal capacity or at a moderate capacity. In a subsequent second phase of the brewing cycle, the pump is activated further at nominal capacity or at a higher capacity in order to achieve as far as possible a high pressure in the second phase of the brewing cycle inside the brewing chamber.

The U.S. Unexamined Laid-Open Patent Application U.S. 2007/0261564 A1 discloses a method for extracting an espresso coffee beverage from an espresso coffee machine wherein the espresso coffee machine has an extraction chamber to which hot brewing water can be supplied in a controlled manner. In the method known previously from US 2007/0261564 A1, it is provided to introduce hot water at reduced pressure or a reduced flow rate into the brewing chamber during a pre-brewing process step and after a brewing pause to introduce brewing water during a second brewing phase at a high pressure or a high flow rate into the brewing chamber.

Known methods for producing coffee beverages of the type mentioned initially in conventional coffee machines now have the disadvantage that during a brewing process, depending on the chamber pressure inside the brewing chamber, the cream valve opens suddenly at an arbitrary time point which is dependent on various perturbing parameters such as, for example, varying spring pre-tension or sticking of the rubber plug so that the coffee beverage leaving the brewing chamber at high pressure and guided into the coffee outlet shoots at high speed and initially high pressure from the coffee outlet of the coffee machine, for example, into an empty cup.

Such an initially abrupt escape of the coffee beverage can, however, lead to a spraying of the coffee beverage at the coffee outlet in a disadvantageous manner. In the worst case with extensive spraying, it is even possible for persons standing nearby to be scalded.

It is therefore the object of the present invention to avoid the said disadvantages and in particular provide a method for producing a coffee beverage in a brewing chamber and a coffee machine for performing the method with which the dispensing of coffee, in particular in a first phase of drawing the coffee at the outlet can be improved with at the same time optimised wetting of the ground coffee and with the same high cream quality when a cream valve is used.

This object is solved by a method for producing a coffee beverage having the features of patent claim 1 and by a coffee machine having the features of patent claim 11.

For a method according to the invention for producing a coffee beverage in a brewing apparatus of a coffee machine, the brewing apparatus comprises a brewing chamber for receiving ground coffee and the brewing chamber has a brewing water inlet and a chamber outlet. By introducing hot brewing water into the brewing chamber through the brewing water inlet, the brewing water running through the brewing chamber wets the ground coffee contained in the brewing chamber so that brewed coffee beverage can be dispensed at the chamber outlet. The coffee machine is further equipped with a cream valve wherein the cream valve is pre-tensioned in the closure direction by means of an automatic mechanical restoring device and which closes the chamber outlet of the brewing chamber in its closed position predefined by the pretension. By overcoming the pretension of the restoring device, in particular of a spiral spring, the cream valve is designed to release the chamber outlet to form a passage gap.

The method according to the invention comprises a first supply step and a second supply step, wherein in the first supply step initially brewing water is supplied to the brewing water inlet of the brewing chamber at a first volume flow rate different from zero during a first period of time of a first brewing phase and wherein in a second supply step, brewing water is supplied at least intermittently to the brewing water inlet at a second and/or third volume flow rate different from zero during a period of time immediately after the first period of time of the first brewing phase. During this period of time immediately after the first period of time of the first brewing phase, the cream valve opens due to the suitable selection of the second or third volume flow. In the method according to the invention the second volume flow rate of the brewing water is different from the first volume flow rate.

In the method according to the invention, the first period of time of the first brewing phase in this case preferably also comprises the period of time in which an initial build-up of the brewing pressure inside the brewing chamber takes place.

The method according to the invention has the particular advantage, inter alia, that by means of a suitable selection of the first volume flow rate during the first period of time of a first brewing phase and also by means of a suitable selection of the second or third volume flow rate during the immediately following period of time, an abrupt, i.e. sudden opening of the cream valve can be largely avoided so that in particular on commencement of coffee withdrawal, the coffee beverage is not dispensed abruptly and at high pressure from the chamber outlet. Through suitable selection of the first and the second or third volume flow rate, a sufficiently high dispensing rate of the brewed coffee beverage from the chamber outlet is ensured at the same time. Since at the same time the grounds are wetted comparatively slowly at least during one of the periods of time, the flavours and aromas which are to be released from the ground coffee have sufficient time to be transferred into the aqueous phase. As a result of the slower flow rate of the brewing water through the brewing water at least during one of the periods of time, it is at the same time ensured that a heating element heating the brewing water can deliver a more constant temperature to the brewing water so that the brewing temperature remains largely constant during the brewing process.

In an advantageous further development of the invention it is provided that the individual periods of time are determined by a volume measurement. In particular it is feasible here to measure the amount of brewing water supplied to the brewing chamber, where preferably a flow meter can be used here. In this case, for example, depending on a certain known brewing pressure range relative to the amount of brewing water supplied to the brewing chamber in the first brewing phase or also—following the build-up of pressure—depending on a pre-selected or pre-selectable amount of coffee beverage to be dispensed, the duration of the periods of time is related to a volume quantity. It is thereby ensured that regardless of the specific opening time point of the cream valve, an always comparable amount of brewing water is supplied to the brewing chamber, in particular during the first period of time of the first brewing phase in which the build-up of brewing pressure takes place. It is further ensured that the dispensed quantity of coffee beverage can be determined relatively accurately.

In an analogous manner, it can also be provided instead or additionally to measure the volume dispensed from the brewing chamber. Here also a flow meter can again be used which, for example, is disposed between the brewing chamber outlet and the coffee dispensing line. Naturally, such an outlet-based measurement is only possible after opening the cream valve, i.e. in particular not during the first period of time of the first brewing phase. A supply-based volume measurement is therefore preferably supported by such an outlet-based measurement.

Preferably the second process step of the method according to the invention comprises a step of supplying brewing water to the brewing water inlet at a second volume flow rate different from zero during a second period of time of the first brewing phase.

It is further provided for example that the second volume flow rate is lower than the first volume flow rate. By this means it can be achieved that the brewing process is initiated relatively rapidly, i.e. during the first period of time during which the first larger volume flow flows into the brewing chamber, the coffee powder is largely completely wetted. By reducing the volume flow rate in the following second period of time of the first brewing phase it is then ensured that despite the relatively fast introduction of the brewing process of the first brewing phase, the cream valve is relatively gently opened which also results in a gentle, relatively uniform release of the brewed coffee beverage from the chamber outlet even directly after this opening process of the cream valve.

Similarly it can be provided that the third volume flow rate is lower than the first volume flow rate so that again a relatively gentle uniform opening of the cream valve is ensured.

For further improvement of the quality of the dispensed brewed coffee beverage, a further second brewing phase following the first brewing phase can be provided. Usually in such a case, the so-called pre-brewing, i.e. the largely complete wetting of the ground coffee inside the brewing chamber with brewing water takes place during the first brewing phase; the actual coffee brewing then takes place in the following second brewing phase. In such a case, the method according to the invention additionally comprises a third and a fourth brewing water supply step, wherein during the third brewing water supply step brewing water is supplied to the brewing water inlet of the brewing chamber at a third volume flow rate different from zero during a first period of time of the second brewing phase and wherein in the fourth supply step, brewing water is supplied to the brewing water inlet at a volume flow rate different from zero during a second period of time of the second brewing phase. For this advantageous further development the fourth volume flow rate is different from the third volume flow rate.

It is advantageous but not absolutely necessary here that the third volume flow rate during the first period of time of the second brewing phase lies in a similar order of magnitude to the second volume flow rate during the second period of time of the first brewing phase. In each case, as a result of a suitable choice of the third volume flow rate in particular in relation to the second volume flow rate, it is ensured that the cream valve however again opens relatively gently with relatively slow release of the chamber outlet, even when this is to be pressed back into its closure position again by the restoring device after the end of the second period of time of the first brewing phase. Likewise, it can be ensured in this way that even if the cream valve was not opened at all during the second period of time of the first brewing phase, in each case a gentle release of the chamber outlet, i.e. a gentle opening of the cream valve, takes place in the following first period of time of the second brewing phase. Such behaviour can result in particular from varying parameters of the cream valve—such as wear of the restoring device or sticking of a sealing rubber plug fastened on the cream valve to the cream outlet. Although the opening time of the cream valve cannot be specified precisely in advance as a result of varying factors, as a result of this advantageous further development of the method according to the invention, it is however ensured that an opening of the cream valve takes place gently and not abruptly at least during one of the two periods of time in question, i.e. during the second period of time of the first brewing phase and/or during the first period of time of the second brewing phase. By this means in particular, costly additional sensors which detect an opening or closing of the cream valve can be dispensed with.

In a further advantageous further development of the method according to the invention, it is provided that the fourth volume flow rate is higher than the third volume flow rate. Whereas the relatively gentle opening of the cream valve in this case has taken place in any case during the second period of time of the first brewing phase and/or during the first period of time of the second brewing phase, and the chamber outlet of the brewing chamber is then in an open state, as a result of a subsequent increase in the brewing water volume flow rate during the second period of time of the second brewing phase the coffee beverage can then be dispensed promptly. In addition to a shortening of the waiting time for the ready-brewed coffee beverage, this prompt dispensing during the second period of time of the second brewing phase due to the higher fourth volume flow rate compared to the third volume flow rate furthermore has the advantage that unnecessarily many bitter substances which could adversely affect the flavour of the coffee beverage in a disagreeable manner are not released from the ground coffee.

It can furthermore be provided in an advantageous manner to interrupt the supply of brewing water to the brewing water inlet during a brewing pause which is situated in time between the first brewing phase and the second brewing phase. In such a brewing pause between the pre-brewing phase and the coffee brewing, i.e. between the first brewing phase and the second brewing phase, due to the correspondingly slower wetting of the grounds by the brewing water residing in the brewing chamber during the brewing pause, the quality of the coffee beverage to be dispensed can be further increased, since the period of time in which the flavours and the aromas are transferred into the aqueous phase is further lengthened.

At the same time however it is also ensured in this case that the cream valve is opened relatively gently—i.e. during the second period of time of the first brewing phase in which the second volume flow flows through the brewing chamber and/or during the first period of time of the second brewing phase whilst the third volume flow flows through the brewing chamber so that in this case also no undesired splashing of the coffee outlet jet occurs at a coffee outlet located after the chamber outlet.

In a particularly advantageous manner the method is adapted in such a manner that during the first period of time of the first brewing phase a larger volume of brewing water is supplied to the brewing chamber than during the second period of time of the first brewing phase. In this case, a sufficient pressure is built up inside the brewing chamber at a relatively high rate during the first period of time so that the grounds are essentially completely wetted. At the same time, the volume flow rate in this case is only reduced when a pressure-dependent opening of the cream valve is to be expected for the first time with the framework of the valve parameters of the cream valve. It is preferably provided that during the first period of time of the first brewing phase approximately 80% of the entire brewing water volume of the first brewing phase is supplied. Consequently, the remaining 20% of the brewing water volume provided for the first brewing phase remains for the second period of time of the first brewing phase. As a result of such a division, a relatively fast overall coffee preparation time can be achieved without the volume flow being reduced early. By this means an abrupt opening of the cream valve can again be avoided.

Similarly it can alternatively or additionally be provided to supply a smaller volume to the brewing chamber during the first period of time of the second brewing phase than during the second period of time of the second brewing phase. As a result, in particular the advantage is achieved that during the second brewing phase, i.e. during the principal coffee brewing, the entire time required for coffee withdrawal is reduced in an optimal manner. Since the desired gentle opening of the cream valve was thus ensured during a relatively short first time interval of the second brewing phase, a prompt dispensing of coffee is achieved as a result of the high fourth volume flow rate during the second period of time of the second brewing phase compared with the third volume flow rate.

In a particularly advantageous manner it is provided that the second period of time of the first brewing phase follows the first period of time of the first brewing phase directly and free from interruption. Similarly it can be provided alternatively or additionally that the second period of time of the second brewing phase follows the first period of time of the second brewing phase directly and free from interruption. As a result of the interruption-free reduction or increase in the respective volume flows, a continuous flow through the brewing chamber can then be achieved. This continuous flow through the brewing chamber or the continuous increase in pressure has the advantage that the cream valve is not pressed back into its closed position after its opening due to the pressure drop at the chamber outlet. Furthermore, valve flapping can be largely avoided thereby.

In a coffee machine for carrying out the method according to the invention a pump is provided which supplies the brewing water to the brewing water inlet of the brewing clamber. Furthermore, in a coffee machine for carrying out the method according to the invention a pump control device is provided for activating the pump. The provision of a pump which can be activated by means of the pump control device has the advantage that, for example, by controlling the capacity of the pump, the required variability of the individual volume flow rates can be achieved relatively simply.

In particular, it can be provided to configure the pump as an oscillating piston pump. Such a pump designed as an oscillating piston pump for supplying the brewing water in particular has the advantage of easy controllability in regard to the volume flow rates with, at the same time, good efficiency and long lifetime. However, it is naturally also possible to use other types of pumps provided that these allow the time-based controllability of the volume flow rate required for the method according to the invention.

It can advantageously be provided to design the pump control device of the coffee machine for carrying out the method according to the invention in such a manner that it varies the volume flow rates of the supplied brewing water by activation of the pump in an interruption-free manner. The interruption-free variation of the volume flow rates in particular yields the advantage that the pump conveys continuously which allows a continuous outlet of the brewed coffee beverage and avoids any rebound of liquid inside the dispensing lines and inside the pump.

A variation of the volume flow rates by means of the pump control device during an alternating voltage activation, as is required in any case with an oscillating piston pump, can be achieved in a simple manner by half-wave or period suppression of individual or several successive half-waves or complete periods of the alternating voltage. In this way, a particularly simple reduction of the volume flow rates is possible.

Equally well however in order to reduce the volume flow rates during an alternative voltage activation of the pump a corresponding phase cutting control can be accomplished by the pump control device.

The pump control can further be designed to independently vary various parameters of the method according to the invention as a function of a set or adjustable type or quantity of the ground coffee. These parameters include in particular the commencement of the first period of time and the second period of time of the first brewing phase and similarly the commencement of the first period of time and the second period of time of the second brewing phase. Likewise these parameters include the durations of the respective periods of time of the first brewing phase and similarly the duration of the periods of time of the second brewing phase. Likewise, it can be provided to vary independently the duration of the brewing pause of the method according to the invention with the aid of the pump control device.

Further details of the invention and in particular an embodiment of the method according to the invention are explained in detail hereinafter with reference to the appended drawings. In the figures.

Figure 1:
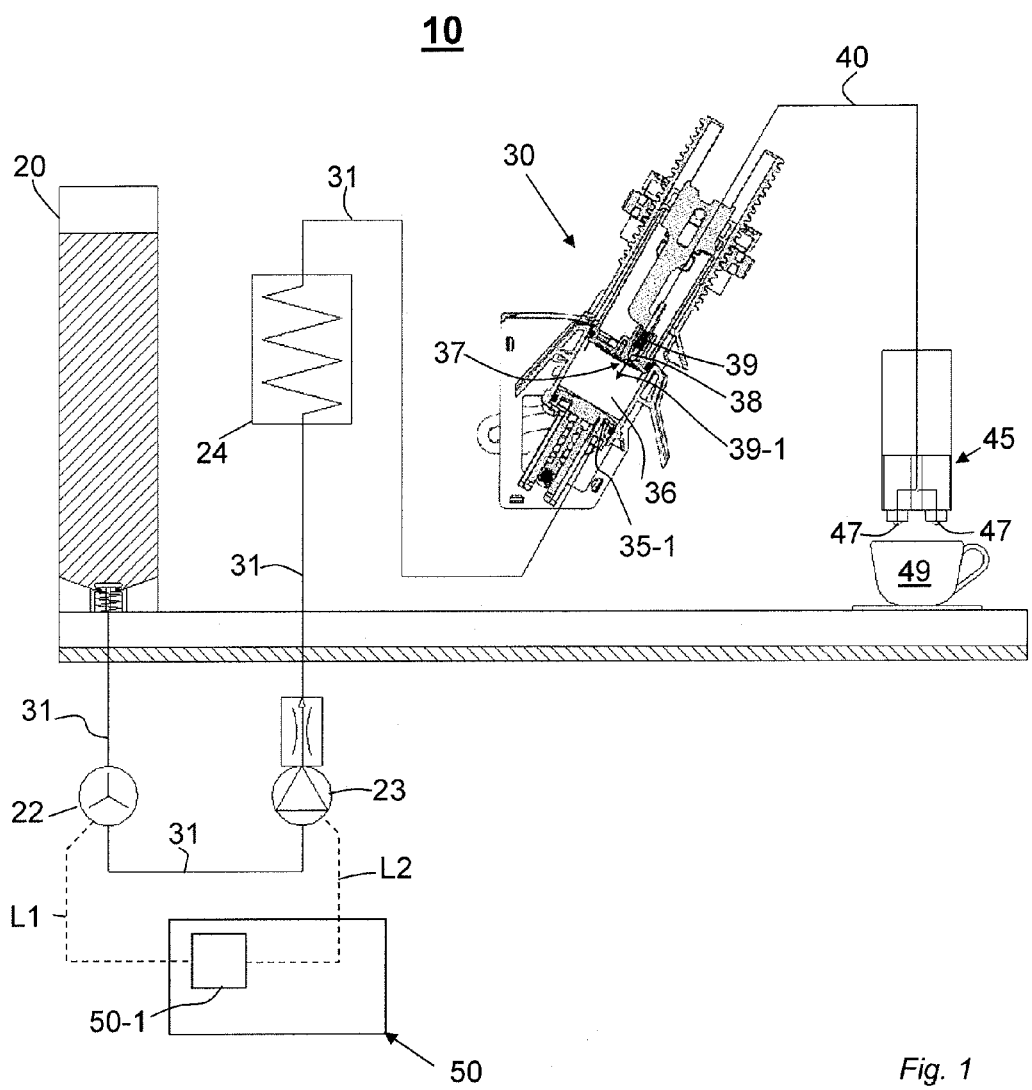
FIG. 1 shows a schematic diagram of a coffee machine with a brewing water pump, a brewing apparatus surrounding a brewing chamber and a cream valve.
Figure 3:
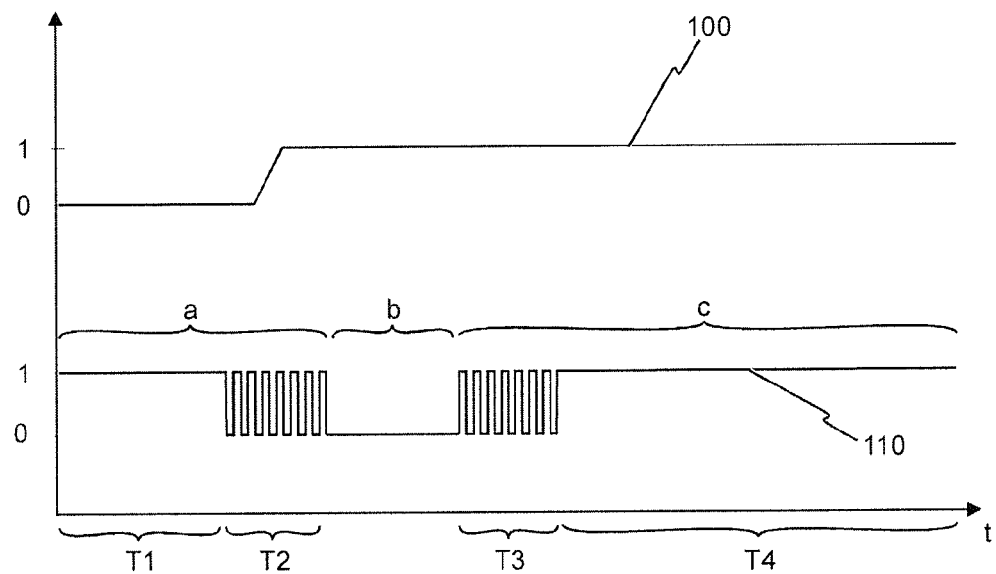
Figure 4:
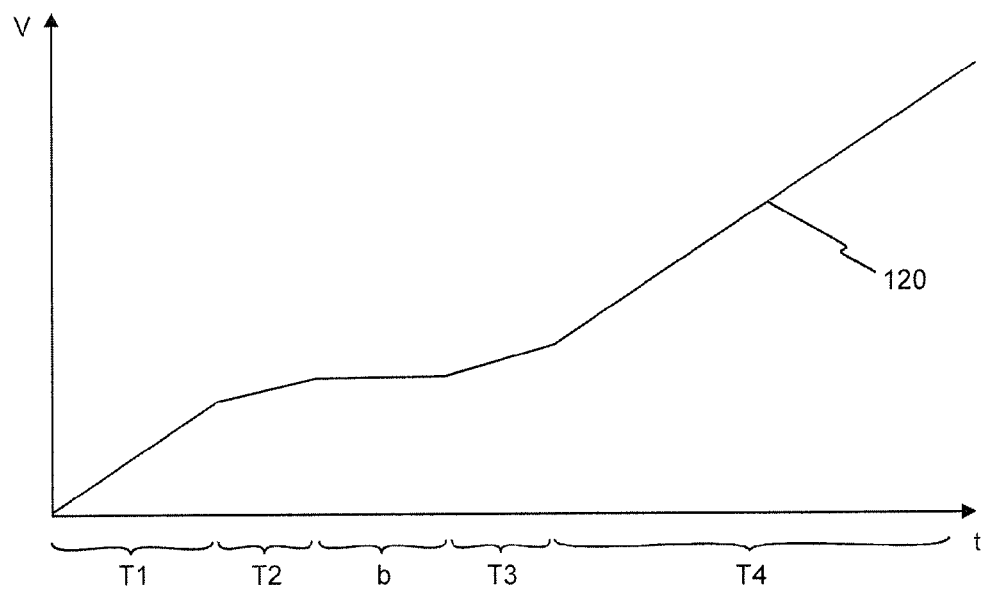

FIG. 3 shows a combined diagram of the position of the cream valve and the switch-on time periods of the brewing water pump, in each case over the time in the coffee machine according to FIG. 1 when carrying out the method according to the invention according to the embodiment; and FIG. 4 shows a further diagram corresponding to the time axis of the diagram from FIG. 1 showing the conveyed brewing water volume over time.

FIG. 1 shows a coffee machine 10—suitable for carrying out the method according to the invention for producing a coffee beverage—comprising a brewing apparatus 30 for producing a coffee beverage. The brewing apparatus 30 in particular comprises a brewing chamber 36 for receiving ground coffee, wherein the brewing chamber 36 has a brewing water inlet 35-1 for supplying brewing water and a chamber outlet 37 for removing a coffee beverage brewed in the brewing chamber 36.

Figure 2:
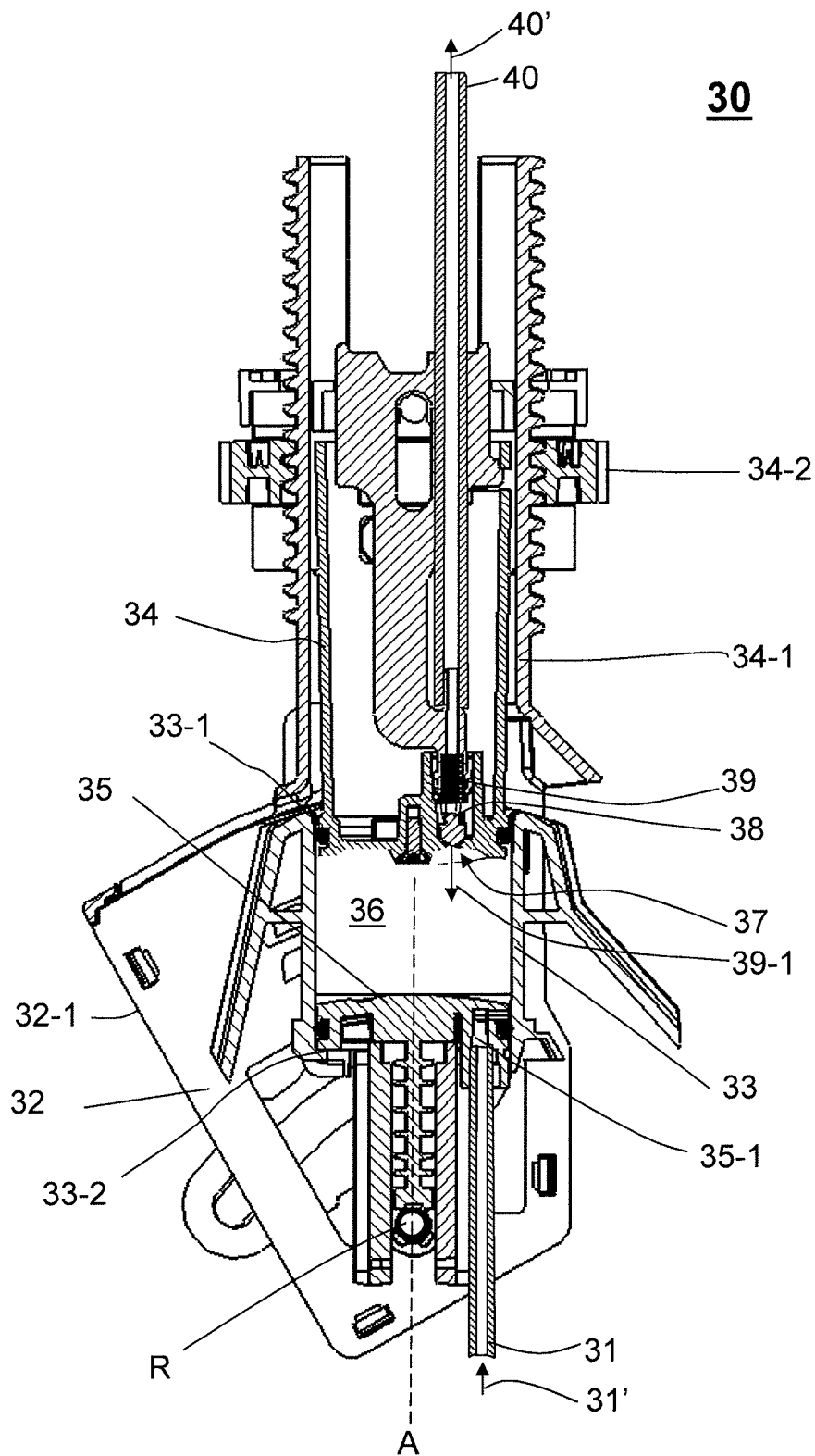
FIG. 2 shows the brewing apparatus according to FIG. 1 in a longitudinal section.

As FIGS. 1 and 2 indicate, the brewing apparatus 30 is connected to a brewing water supply line 31 opening into the brewing water inlet 35-1, through which brewing water heated for the purpose of brewing a coffee beverage is introduced into the brewing chamber 36. The required brewing water temperature (preferably in the range between 90 and 95° C.) in the brewing water supply line 31 is ensured by heating in a brewing water heater 24 which, for example, can be configured as a through-flow heater. For this purpose, fresh water from a water tank 20 is supplied to the brewing water heater 24, wherein the required water pressure is built up by a (brewing water) pump 23 which in the present example is disposed between the water tank 20 and the brewing water heater 24.

The coffee machine 10 further comprises a coffee dispensing line 40 which connects the brewing chamber 36 to a coffee dispensing device 45 and has a brewing-chamber-side end region connected to the brewing chamber 36 and a dispensing-side end region connected to a coffee dispensing device 45. The brewing-side end region of the coffee dispensing line 40 is in fluid communication with the chamber outlet 37 and is used to receive a coffee beverage brewed in the brewing chamber 36. In the present example, the coffee dispensing line 40 at an end facing away from the brewing apparatus 30 opens into the coffee dispensing device 45, which comprises two adjacently disposed coffee outlet openings 47 through which a coffee beverage brewed in the brewing apparatus 30 can flow from the coffee dispensing line 40, for example, into a drinking vessel 49 disposed below the coffee outlet openings 47. Furthermore, a flow meter 22 is provided in the brewing water supply line 31 between the water tank 20 and the brewing water heater 24 in order to provide information about the quantity of brewing water supplied to the brewing chamber 36 or information about the volume flow rate of the brewing water supplied into the brewing chamber 36. A similar flow meter can naturally also be disposed between the brewing water heater 24 and the brewing apparatus 30. Furthermore, it is feasible to additionally or exclusively provide a similar flow meter in the coffee dispensing line 40.

As indicated in FIG. 1, the coffee machine 10 is further equipped with a control unit 50 which inter alia comprises a pump control device 50-1 for controlling the pump 23 and is further configured to control the continuous flow heater 24 and the brewing apparatus 30. As indicated in FIG. 1 in particular, the control unit 50 or the pump control device 50-1 is connected to the flow meter 22 via a line L1 for transmission of measurement and/or control signals so that measurement signals of the flow meter 22 relating to the quantity of brewing water supplied to the brewing chamber 36 or relating to the volume flow rate of the brewing water fed into the brewing chamber 36 can be transmitted via the line L1 to the control unit 50 or the pump control device 50-1. Furthermore, the pump control device 50-1 is connected to the (brewing water) pump 23 via a line L2 for transmission of control signals, wherein control signals can be transmitted via this line L2 between the pump control device 50-1 and the pump 23 in order to enable control of the pump 23.

Details of the brewing apparatus 30 are apparent from FIG. 2. The brewing apparatus 30 is designed for the fully automatic preparation of brewed coffee beverages, in particular espresso, and is based in regard to its construction on concepts known, for example, from EP 0 559 620 or EP 2 196 116. The brewing apparatus 30 comprises a number of components which are fastened to a supporting structure 32 and can be mounted together with the supporting structure 32 as a whole in the coffee machine 10. The brewing apparatus 30 comprises in particular a brewing cylinder 33 which is mounted on the supporting structure 32 in such a manner that it is pivotable about an axis of rotation R (directed perpendicular to the plane of the drawing in FIG. 2). It is thereby possible to pivot the brewing cylinder 33 (by means of a drive not shown in FIG. 2) into two different positions. FIG. 2 shows the brewing cylinder 33 in a position in which the brewing apparatus 30 is ready to prepare a brewed coffee beverage. In this position the brewing cylinder 33 is positioned in such a manner that one end of a brewing piston 34 which is linearly movable in the longitudinal direction of a guide 43-1 fastened to the supporting structure and is movable by means of a drive 34-2 along the guide 34-1, can be moved along a longitudinal axis A of the brewing cylinder 33 through an opening 33-1 formed at one end of the brewing cylinder 32 into the brewing cylinder 33 so that this opening 33-1 is tightly closed by the brewing piston 34. At an end opposite the opening 33-1 the brewing cylinder has a second opening 33-2 which is tightly closed by means of a piston 35 which is movable along the longitudinal axis A of the brewing cylinder 33. During the brewing of coffee the brewing piston 34 and the piston 35 are positioned relative to the brewing cylinder 34 in such a manner that the brewing chamber 36 is formed in the brewing cylinder 33 between the brewing piston 34 and the piston 35.

In order to be able to prepare a coffee beverage with the brewing apparatus 30, it must initially be ensured that the brewing chamber 36 is filled with coffee powder. As can be seen from FIG. 2, one end of the brewing water supply line opens into the brewing water inlet 35-1 which is configured in the piston 35 as a through channel and is connected to the brewing chamber 36 by means of a plurality of openings (not shown in FIG. 2). Hot brewing water can be supplied under pressure into the brewing chamber 36 via the brewing water supply line 31 (as indicated by an arrow 31' in FIG. 2). As FIG. 2 further indicates, the chamber outlet 37 of the brewing chamber 36 is integrated in the brewing piston 34. A coffee beverage brewed in the brewing chamber 36 can leave the brewing chamber 36 through the chamber outlet 37. As can be seen from FIG. 2, one end of the coffee dispensing line 40 is connected to the chamber outlet 37 so that the brewed coffee beverage can flow into the coffee dispensing line 40 and to the coffee dispensing openings 47 (as indicated by an arrow 40' in FIG. 2). As FIG. 2 further indicates, a cream valve 38 is placed in the chamber outlet 37 of the brewing chamber 36.

The cream valve 38 is designed in such a manner that holds the chamber outlet 37 of the brewing chamber 36 closed as long as the pressure of the brewing water in the brewing chamber 36 falls below a predefined minimum value and releases the chamber outlet 37 for dispensing a brewed coffee beverage (e.g. espresso) when the pressure of the brewing water in the brewing chamber 36 exceeds the predefined minimum value.

For this purpose the cream valve 38 is configured as a movable piston which tightly closes the chamber outlet 37 in a closed position of the cream valve 38. FIG. 2 shows the cream valve 38 in the closed position. Furthermore, the brewing apparatus 30 comprises an independent mechanical restoring apparatus 39 which pre-tensions the cream valve 38 in a closing direction 39-1 (given by an arrow 39-1 in FIGS. 1 and 2) of the cream valve 38, wherein the cream valve 38—starting from the closed position according to FIG. 2—can be moved contrary to the closing direction 39-1 into an (open) position in which the chamber outlet 37 is released and a passage gap is formed between the chamber outlet 37 and the cream valve 38 which forms a through connection for the coffee beverage between the brewing chamber 36 and the coffee dispensing line 40. In the present example, the restoring apparatus 39 is configured as a spiral spring. This is pre-tensioned in the closing direction 39-1 in such a manner that—when the cream valve 38 is located in the closed position (FIG. 2)—it exerts a force directed in the closing direction 39-1 on the cream valve 38 and in addition, if the cream valve 38 is moved contrary to the closing direction 39-1, exerts a restoring force directed in the closing direction 39-1 on the cream valve 38.

In order to fill the brewing chamber 36 with coffee powder before preparing a coffee beverage or to remove the coffee powder used for brewing the coffee beverage from the brewing cylinder 33 again after preparing a coffee beverage, the brewing cylinder 33 can be pivoted on a side edge 32-1 of the supporting structure 32. To this end, the brewing piston 34 must initially be moved by means of the drive 34-2 along the guide 34-1 in such a manner that the brewing piston 34 no longer projects into the brewing cylinder 33 and does not close the opening 33-1. When the brewing cylinder 33 is pivoted to the side edge 32-1 of the supporting structure 32, the opening 33-1 of the brewing cylinder 33 is freely accessible so that if desired, brewed coffee powder can be removed (with the aid of the piston 35) through the opening 33-1 (for example, automatically) or coffee powder intended for brewing can be filled through the opening 33-1 into the brewing cylinder 33 (for example, automatically).

The cream valve 38 can be designed in such a manner that coffee powder can be brewed in the brewing chamber 36 with brewing water at a pressure of 5 bar or a higher pressure. Accordingly, the pump 23 can be designed in such a manner that brewing water can be introduced into the brewing chamber at a pressure of 5 bar or a higher pressure. Subject to these conditions, the brewing apparatus 30 makes it possible in particular to prepare a brewed coffee beverage in the form of espresso.

The sequence of a brewing process of a coffee beverage according to the present invention is explained in detail in the following.

After starting up the pump 23, fresh water is conveyed from the water tank 20 in the direction of the brewing water heater 24, wherein the quantity of through-flowing water is determined by the flow meter 22 and this information is supplied to the control unit 50 or the pump control device 50-1. The brewing water heater 24 heats the fresh water flowing through it to the temperature required for brewing the coffee beverage, which is usually between 90 and 95° C.

By appropriate preparation, e.g. by filling the brewing chamber 36 with coffee powder, the brewing apparatus 30 is in a ready-to-brew state at the beginning of the brewing process. The correspondingly temperature-controlled brewing water which is provided at the brewing water inlet 35-1 is now used inside the brewing apparatus 30 to prepare the coffee beverage and dispense it to the chamber outlet 37 of the brewing chamber 36.

In the combined diagram according to FIG. 3, the upper part initially shows the variation in time 100 of the position of the cream valve 38 of the coffee machine 10 when performing the method according to the invention. Here the position designated by 0 designates the position of the closing position of the cream valve 38, i.e. that position in which the cream valve 38 closes the chamber outlet 37 of the brewing chamber 36. The position designated by 1 here corresponds to a position of the cream valve 38 in which the chamber outlet 37 is "completely" open, i.e. in which a passage gap is formed between the chamber outlet 37 and the cream valve 38 and the cream valve 38 is removed far from its closing position in such a manner that the width of the passage gap is maximal.

The lower part of the combined diagram according to FIG. 3 shows the variation in time 110 of the activation of the brewing water pump 23 which conveys brewing water to the brewing water inlet 35-1 of the brewing chamber 36. In this diagram the full pump capacity is designated by 1 and a pump standstill by 0.

In order to reduce the effective conveying capacity, it is provided in sections to activate the (brewing water) pump 23 in a pulsed manner. These regions can be identified in the diagram by a rapid change between the state 0 (pump standstill) and 1 (full active operation of the pump 23).

As can be seen from the diagram in FIG. 3, a brewing pause b is provided between a first brewing phase a and a second brewing phase c in which the pump control device 50-1 stops the operation of the pump 23. During the first brewing phase designated by a, the pump 23 is operated at full capacity during a first period of time T1 so that a relatively large first volume flow rate is obtained.

As can be further identified, the pump capacity is reduced during a second time interval T2 of the first brewing phase a so that the second volume flow rate conveyed by the pump to the brewing water inlet 35-1 during this time is different from zero but is smaller than the first volume flow rate. Preferably the gentle opening of the cream valve takes place in this period of time, which can be identified in the combined diagram in FIG. 3 in the corresponding time interval of the variation in time 100 of the cream valve position.

After the brewing pause b, during a first period of time T3 of the second brewing phase c the pump is again operated with the aid of the pump control device 50-1 in a mode with reduced conveying capacity so that if the cream valve 38 were not yet opened at this time, a likewise gentle opening would be ensured in each case.

In the following second period of time T4 of the second brewing phase c, the pump 23 is again operated at full conveying capacity. This ensures a relatively rapid withdrawal of coffee.

FIG. 4 which corresponds to the diagram from FIG. 3 on the time axis shows the variation in time 120 of the volume V conveyed with the aid of the (brewing water) pump 23 during a brewing process. Such a variation in time can be obtained, for example, by a measurement by means of the flow meter 22. By means of this variation in time of the volume, the pump controller 50-1 can, for example, specify commencement and duration of the individual periods of time (T1, T2, T3, T4) according to the method and thus control and monitor the total quantity of coffee beverage dispensed during the brewing process. Since in addition, the pressure of the brewing water in the brewing chamber 36 (brewing water pressure) up till opening of the cream valve 38 depends on the supplied volume of brewing water, it is possible to make a volume-dependent, relatively accurate and in particular rapid approximation to the required minimum value of the brewing water pressure at which the cream valve 38 opens, i.e. unblocks the chamber outlet 37 during the first period of time T1 of the first brewing phase a.

As can be seen, in each case during the periods of time in which the pump 23 is operated at full capacity, i.e. in the first period of time T1 of the first brewing phase a and in the second period of time T4 of the second brewing phase c per unit time a relatively large volume of brewing water is conveyed through the brewing chamber 36. During the pulsed mode of the (brewing water) pump 23, i.e. whilst the conveying capacity of the (brewing water) pump 23 is reduced, the conveyed volume is accordingly smaller so that a smaller increase is obtained in the diagram shown in FIG. 4 for these periods of time T2 and T3. Within these periods of time immediately before or after the brewing pause b, a correspondingly gentle opening of the cream valve 38 to initiate the coffee dispensing through the chamber outlet 37 can then take place.

The invention claimed is:

1. Method for producing a coffee beverage in a brewing apparatus of a coffee machine, wherein the brewing apparatus comprises a brewing chamber for receiving ground coffee and the brewing chamber has a brewing water inlet and a chamber outlet, wherein the coffee machine has a cream valve which is pre-tensioned in the closure direction by means of an automatic mechanical restoring device and which closes the chamber outlet in its closed position, wherein the method comprises the following process steps:
a) supplying brewing water to the brewing water inlet of the brewing chamber at a first volume flow rate different from zero during a first period of time (T1) of a first brewing phase (a); and
b) supplying brewing water to the brewing water inlet at a second and/or third volume flow rate different from zero during a period of time immediately after the first period of time (T1), wherein the second and/or the third volume flow rate is or are different from the first volume flow rate and wherein the second and/or the third volume flow rate is or are selected in such a manner that the cream valve opens during the period of time immediately after the first period of time (T1),
wherein the second volume flow rate and/or the third volume flow rate is or are lower than the first volume flow rate.

2. The method according to claim 1, wherein the duration of the first period of time (T1) and/or the duration of the period of time immediately after the first period of time is determined by measuring a supply volume of the brewing water supplied in each case or overall and/or by measuring a dispensing volume of the quantity of coffee beverage dispensed in each case or overall.

3. The method according to claim 1, wherein the process step b) comprises the following:
supplying brewing water to the brewing water inlet at a second volume flow rate different from zero during a second period of time (T2) of the first brewing phase (a), wherein the duration of the second period of time (T2) is determined in particular by measuring a supply volume of the brewing water supplied in each case or overall and/or by measuring a dispensing volume of the of the quantity of coffee beverage dispensed in each case or overall.

4. The method according to claim 3, wherein process step b) further comprises the following:
supplying brewing water to the brewing water inlet at a third volume flow rate different from zero during a first period of time (T3) of a second brewing phase (c), wherein the supply of brewing water to the brewing water inlet is interrupted during a brewing pause (b) between the first brewing phase (a) and the second brewing phase (c), and wherein the duration of the third period of time (T3) is determined in particular by measuring a supply volume of the brewing water supplied in each case or overall and/or by measuring a dispensing volume of the quantity of coffee beverage dispensed in each case or overall.

5. The method according to claim 3, wherein the cream valve opens during the second period of time (T2) of the first brewing phase (a).

6. The method according to claim 4, wherein the cream valve opens during the first period of time (T3) of the second brewing phase (c).

7. The method according to claim 3, wherein during the first period of time (T1) of the first brewing phase (a) a larger volume of brewing water is supplied to the brewing chamber than during the second period of time (T2) of the first brewing phase (a).

8. The method according to claim 3, wherein the method further comprises the following process step:
supplying brewing water to the brewing water inlet at a fourth volume flow rate different from zero during a second period of time (T4) of the second brewing phase (c), wherein the fourth volume flow is different from the third volume flow and wherein the duration of the fourth period of time (T4) is determined in particular by measuring a supply volume of the brewing water supplied in each case or overall and/or by measuring a dispensing volume of the quantity of coffee beverage dispensed in each case or overall.

9. The method according to claim 8, wherein a smaller volume of brewing water is supplied to the brewing chamber during the first period of time (T3) of the second brewing phase (c) than during the second period of time (T2) of the second brewing phase (c).

10. The method according to claim 8, wherein the fourth volume flow rate is higher than the third volume flow rate.

11. Coffee machine for carrying out the method according to claim 1, wherein the coffee machine comprises:
- a brewing apparatus having a brewing chamber for receiving ground coffee, which brewing chamber has a brewing water inlet and a chamber outlet,
- a cream valve pre-tensioned with an independent mechanical restoring device in the closing direction, which closes the chamber outlet,
- a pump for supplying the brewing water to the brewing water inlet of the brewing chamber and
- a pump control device for activating the pump,
- wherein the pump control device is designed to activate the pump in such a manner that the pump supplies brewing water to the brewing water inlet of the brewing chamber during a first period of time (T1) of a first brewing phase (a) at a first volume flow rate different from zero and during a period of time immediately after the first period of time (T1) at a second and/or third volume flow rate different from zero,
- wherein the second and/or the third volume flow rate is or are different from the first volume flow rate and wherein the second and/or the third volume flow rate is or are selected in such a manner that the cream valve opens during the period of time immediately after the first period of time (T1),
- wherein the pump control device is configured to activate the pump in such a manner that the second volume flow rate and/or the third volume flow rate is or are lower than the first volume flow rate.

12. The coffee machine according to claim 11, wherein the pump control device is designed to vary the volume flow rates of the supplied brewing water by activating the pump in an interruption-free manner.

13. The coffee machine according to claim 12, wherein the pump control device varies the volume flow rates during alternating voltage activation of the pump by half-wave or period suppression or by phase cutting of the alternating voltage.

14. The coffee machine according to claim 11, wherein the pump control device is further designed to determine the beginning and/or duration of the periods of time (T1, T2) of the first brewing phase (a) and/or the beginning and/or duration of the periods of time (T3, T4) of the second brewing phase (c) in particular by volume measurement, and wherein the pump control device is further designed to independently vary the beginning and/or duration of the periods of time (T1, T2, T3, T4) as a function of a set or adjustable type of quantity of the ground coffee.

15. The method according to claim 1, wherein supplying the brewing water to the brewing water inlet at the second and/or the third volume flow rate different from zero during the period of time immediately after the first period of time (T1) comprises intermittently supplying the brewing water to the brewing water inlet at the second and/or the third volume flow rate different from zero during the period of time immediately after the first period of time (T1).

16. The method according to claim 7, wherein about 80% of the entire brewing water supplied during the first brewing phase (a) is supplied to the brewing chamber during the first period of time (T1) of the first brewing phase (a).

17. The coffee machine according to claim 11, wherein the pump control device is designed to activate the pump in such a manner that the pump supplies brewing water to the brewing water inlet of the brewing chamber intermittently during the period of time immediately after the first period of time (T1) at the second and/or the third volume flow rate different from zero.

* * * * *